United States Patent
Krikorian et al.

(10) Patent No.: US 7,821,619 B2
(45) Date of Patent: Oct. 26, 2010

(54) RAPID SCAN LADAR 3D IMAGING WITH COMPACT DIGITAL BEAM FORMATION

(75) Inventors: Kapriel V. Krikorian, Calabasas, CA (US); Robert A. Rosen, Agora Hills, CA (US); Michael Gubala, Laguna Niguel, CA (US)

(73) Assignee: Raytheon Company, Waltham, MA (US)

( * ) Notice: Subject to any disclaimer, the term of this patent is extended or adjusted under 35 U.S.C. 154(b) by 405 days.

(21) Appl. No.: 12/077,476

(22) Filed: Mar. 19, 2008

(65) Prior Publication Data

US 2009/0237640 A1 Sep. 24, 2009

(51) Int. Cl.
  *G01C 3/08* (2006.01)
(52) U.S. Cl. .................. 356/5.01; 356/5.1; 356/5.15
(58) Field of Classification Search ........ 356/3.01–28.5
  See application file for complete search history.

(56) References Cited

U.S. PATENT DOCUMENTS 5,892,575 A * 4/1999 Marino ...................... 356/5.01

\* cited by examiner

*Primary Examiner*—Thomas H Tarcza
*Assistant Examiner*—Luke D Ratcliffe
(74) *Attorney, Agent, or Firm*—Christie, Parker & Hale, LLP

(57) ABSTRACT

A LADAR system for coherently imaging a target within a volume has a modulated laser transmitter at a frequency and a receiver. The receiver has a plurality of lenses, each with its own detector. Each detector is supplied by a centrally located local oscillator tuned to the frequency. The paths from the local oscillator to each detector, as well as the delay within each lens/detector combination are measured during a calibration. A calibrating reflector reflects a test signal during the calibration at many frequencies, temperatures and accelerations. Measurements of paths and delays obtained during the calibration are stored, and used to phase compensate subsequent target reflections for coherent processing.

40 Claims, 6 Drawing Sheets

RAPID SCAN LADAR 3D IMAGING WITH COMPACT DIGITAL BEAM FORMATION

BACKGROUND OF THE INVENTION

1. Field of Invention

This disclosure is in the field of Laser Radar coherent target detection and imaging.

2. Description of the Related Art

Laser Detection and Ranging (LADAR) uses phase coherent processing at light frequencies to acquire targets within its detection range. Typically, both the velocity and location of a target is the result of the detection process. The principles of LADAR are detailed in the prior art as exemplified by G. C. Bachman in *Laser Radar Systems and Techniques* Artech House, 1979, incorporated herein in its entirety by reference.

LADAR operation is at optical frequencies. These are higher than RADAR microwave frequencies. Thus, compared to RADAR, LADAR uses different concepts, has a theoretical larger bandwidth and higher angular resolution. Operating at optical frequencies, orders of magnitude greater than microwaves, LADAR poses unique advantages and limitations.

One aspect of the complexities of LADAR high frequency operation is the spatial coverage of a transmitted pulse. Unlike the wide dispersion of microwave RADAR frequencies directed and focussed by large antennas, LASER based LADAR emits and detects tightly collimated, narrow LASER energy. Thus, the illumination/reception pattern of a single LADAR pulse has limited solid angle coverage. This limited angular coverage forces LADAR systems to emit multiple pulses and make multiple scans to cover a volume where a target of interest might be located.

Multiple redundant LADAR pulses are also required by signal to noise considerations. LADAR signal to noise reception is sensitive to target reflectivity as well as atmospheric conditions. High humidity, dust, a specular rather than reflective target dictate redundant pulses per unit volume. The constraint of limited angle coverage combined with the need for redundant pulses extends target acquisition time for LADAR within a search volume. Because of these constraints, LADAR search times of a volume may be lengthy, where a fast target may traverse the volume before detection.

SUMMARY OF THE INVENTION

Above limitations are avoided by a LADAR system for coherently imaging a target comprising a laser transmitter illuminating said volume with a laser beam modulated with a frequency. A receiver having isothermal contours, receives calibration reflections of said laser beam from a calibration reflector for calibration purposes. After calibration, target reflections arrive from the target. The receiver has a clock for distributing time stamps within the receiver or a similar means for referencing a time interval to a time reference. The receiver has a plurality of lenses mechanically coupled to a rigid frame. Each lens of said plurality of lenses is optically connected to one detector of a plurality of detectors. Each of the detectors mix the incoming optical input from its associated lens with a signal from the local oscillator.

Each detector has an output voltage after a delay, said delay measured from an arrival time said reflection impinges upon each lens of said plurality of lenses. Each detector is coupled to a local oscillator by a path. The local oscillator is tuned to the frequency. The path and the delay induce a relative phase shift in the output voltage of the detector with respect to the arrival time of the calibration reflection. After calibration, the relative phase shift is applicable to target reflection.

A plurality of analog to digital converters convert said output voltage from each detector of said plurality of detectors into a corresponding plurality of digital detector voltages. The detector voltages are stored in a computer to compute and record a relative phase shift for each digital detector voltage with respect to one of the digital detector voltages during a calibration step. The stored relative phase shift is used after the calibration step, during target tracking and/or imaging, to phase compensate digital detector voltages generated from arrival of target reflections at each lens of said plurality of lenses and detectors.

DETAILED DESCRIPTION

This disclosure introduces the concept of calibrating and distributing a single LADAR local oscillator signal to a plurality of (optical) lenses and associated detectors to facilitate parallel operation of the plurality of lenses for target detection and tracking within a volume.

Figure 1:
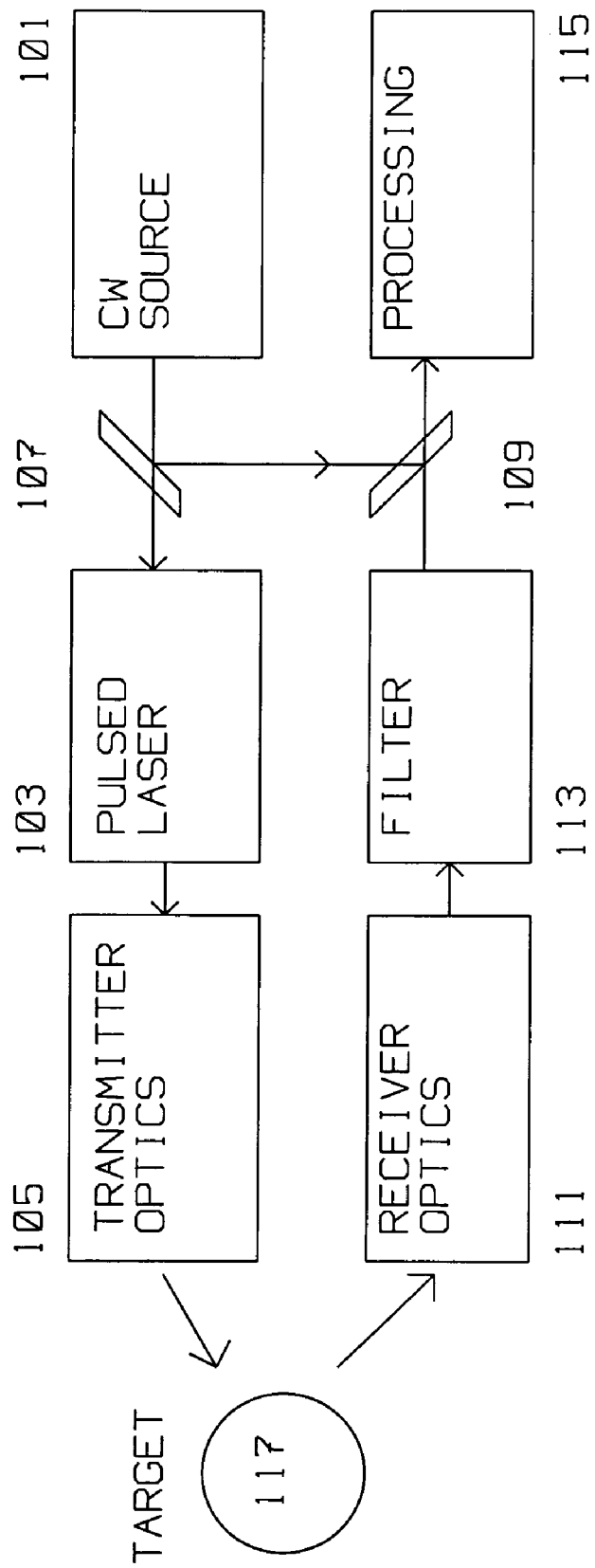
FIG. 1 is a heterodyne LADAR configuration of the prior art

FIG. 1 shows the typical prior art LADAR heterodyne system. Continuous Wave (CW) Source 101 (a local oscillator), operating at a frequency, after passing through Beam Splitter 107, modulates Pulsed LASER 103 for amplification. The output from Pulsed LASER 103 is processed by Transmitter Optics 105 and directed to Target 117. Target 117 reflects part of the LASER energy from Transmitter Optics 105 to Receiver Optics 111. The output of receiver optics 111 is filtered for parameters of interest in filter 113.

A portion of CW Source 101 signal is routed by Beam Splitter 107 to Detector 109, a photo detector sensitive to energy from pulsed laser 103. Typically, CW Source 101 is adjusted to correspond to the Doppler shift induced by the motion of target 117 with respect to output from Transmitter Optics 105. When the frequency of CW Source 101 is matched to the Doppler shift, Processing 115 will see a maximum from detector 109, indicating Target 117 velocity.

Figure 2:
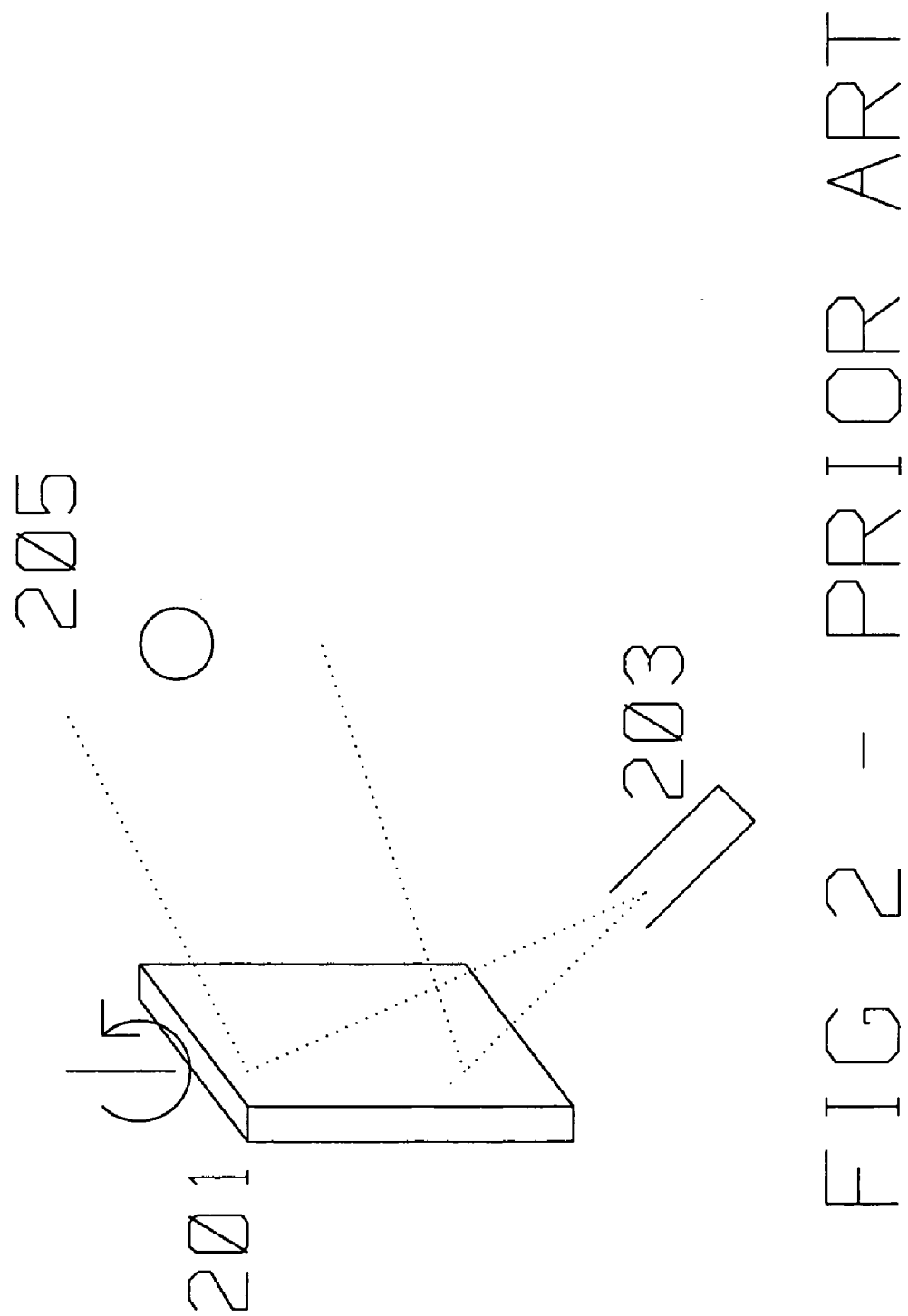
FIG. 2 is a conceptualized rotating mirror/splitter based LADAR configuration of the prior art.

However, the apparatus in FIG. 1 has a major limitation. It assumes target 117 is in a relatively well defined position illuminated by transmitter optics 105, and target reflections are returned to Receiver Optics 111. The narrow nature of the LASER beam severely restricts volume coverage of a single LASER beam. To avoid this limitation, the prior art has devised mirror based techniques to scan a volume for the presence of a target. For example, as described in U.S. Pat. No. 7,135,672 to Land, a flash LADAR system uses rotating mirrors to allow coverage over a volume. For the purposes of this disclosure, FIG. 2 summarizes operation of a typical prior art mirror based LADAR system where a LASER fan beam is reflected by a mirror to extend coverage. In FIG. 2, LADAR transmitter/receiver 203 illuminates rotating mirror 201 with a fan beam. Rotating Mirror 201 sweeps a volume including target 205. Reflections from target 205 are returned via mirror 201 to transmitter/receiver 203 for detection.

The technical challenges and limitations of FIG. 2 are many. For example, Rotating Mirror 201 requires stable support bearings (gimbals) at operating, full rotational speed. Any mechanical vibration of the rotating mirror presents uncertainty as to the LADAR's beam position. For coherent processing, the effect of rotating mirror vibration has to be kept small, in the order of a fraction of wavelength. The effect of vibration is amplified by the range of the target to be detected. The further away Target 205 is from Rotating Mirror 201, the greater the angular and range errors induced from mirror vibration. Mirror vibration also influences target velocity measurements, as it becomes uncertain whether incoming signal Doppler phase shifts are due to target motion or mirror vibration. Mirror surface deviations and irregularities further add to measurement uncertainties.

Figure 3:
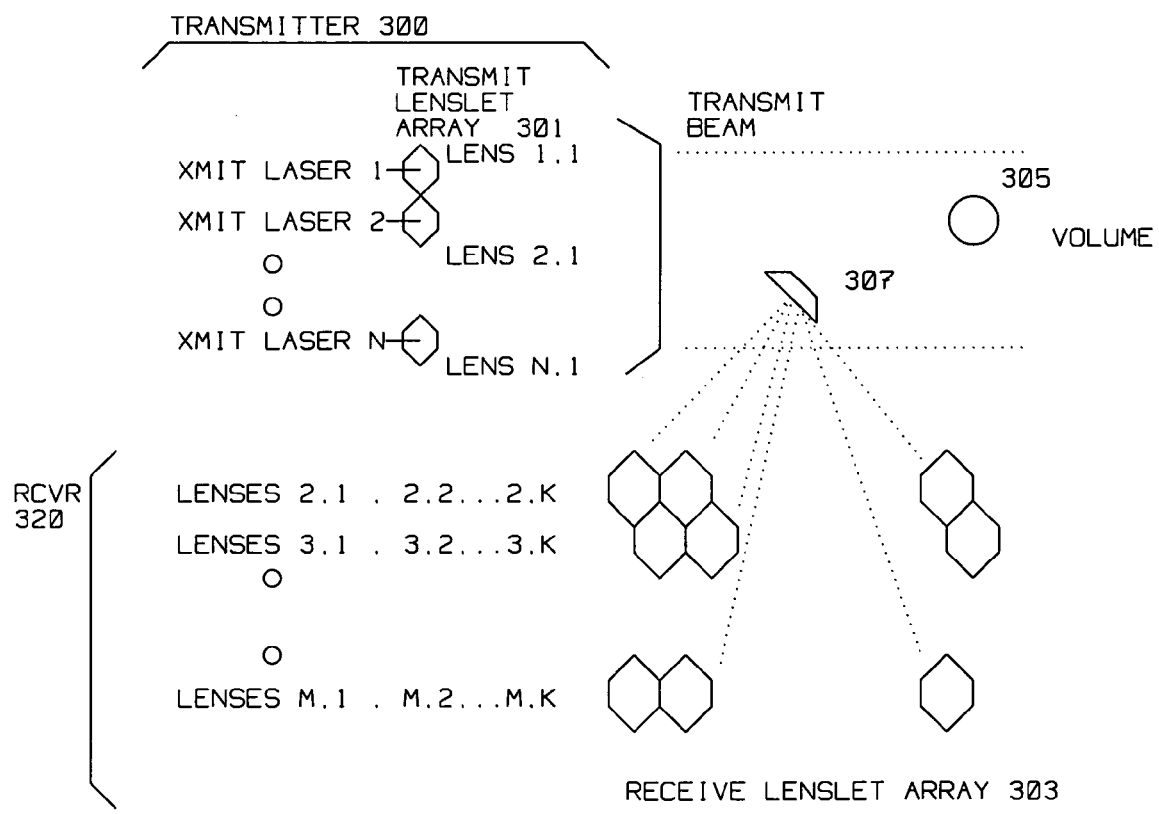
FIG. 3 shows transmitter and receiver configuration of the present disclosure.

FIG. 3 shows a configuration of the present disclosure. Part of a LADAR system, Xmit laser 1, 2, . . . N is channeled via lenses 1,1, 2,1, . . . N,1, part of transmitter lenslet array 301, to form a transmit beam. The transmit beams are modulated at a frequency and cover a volume containing target 305 and Calibration Reflector 307. Calibration Reflector 307 is used for calibration purposes. Calibration Reflector 307 is also within the volume covered by the transmit beam, at a known position with respect to Receiver Lenslet Array 303 and reflects a portion of the transmit beam into Receiver Lenslet Array 303 during the calibration step. Receiver Lenslet Array 303 is made up of a plurality of lenses of short focal length, arranged rows and columns. Thus, the Receiver Lenslet Array 303 is made up 2 to M rows and K columns of lenses:

lenses 2,1, 2,2 up to 2,K
lenses 3,2, 3,2 up to 3,K
. . .
lenses M,1, M,2 up to M,K The field of view of the combined lenses within Receiver Lenslet Array 303 covers the volume illuminated by the transmit beam. Transmitter Lenslet Array 301 may optionally be part of the same array of lenslets as Receiver Lenslet Array 303. In one embodiment, Calibration Reflector 307 is located in the optical far field of the combination of lenses making up Receiver Lenslet Array 303.

Figure 4:
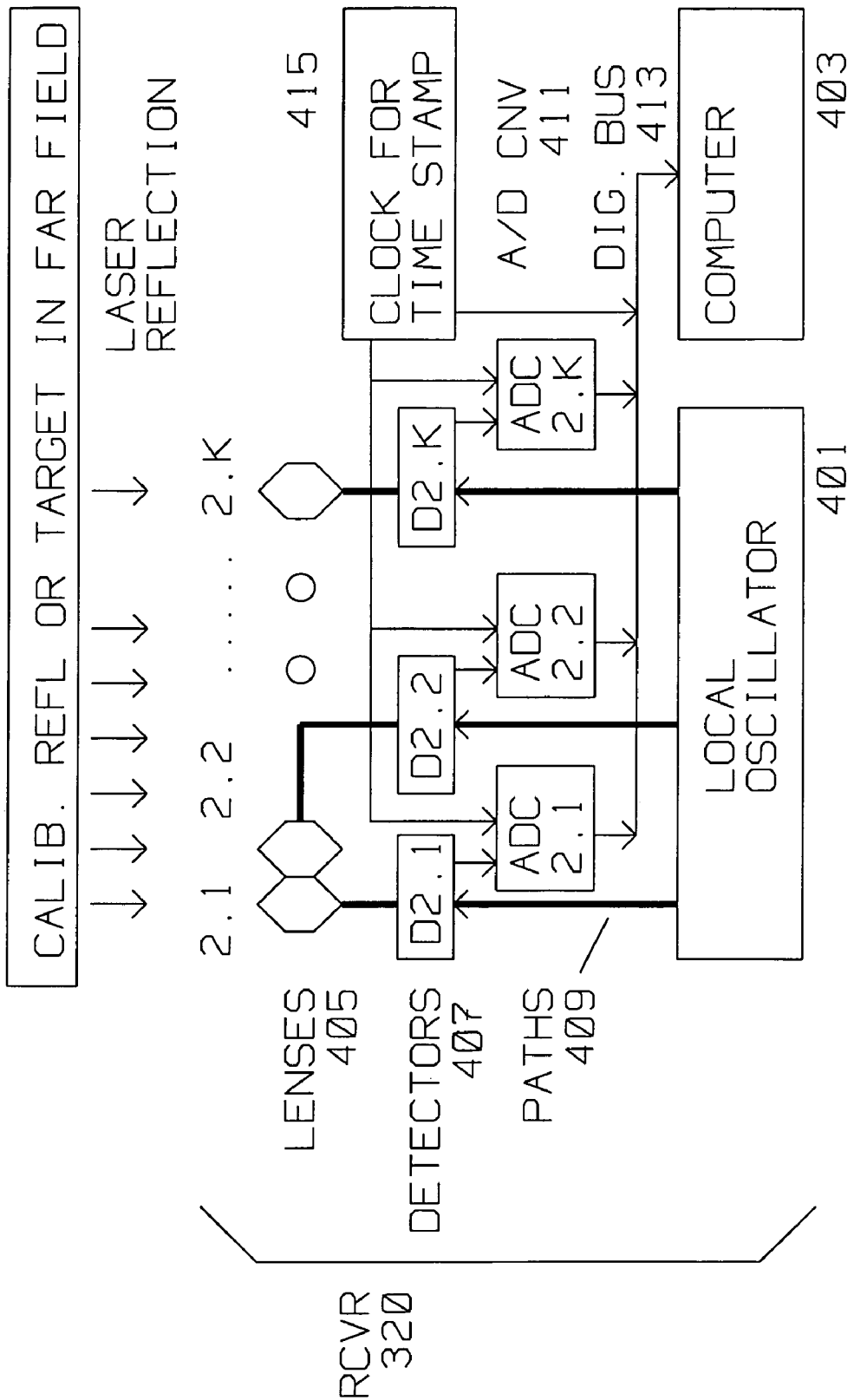
FIG. 4 shows the receiver configuration of the present disclosure.

FIG. 4 further details Receiver 320 for receiving reflections of said laser beam from either Calibration Reflector 307 or, after the calibration step, from Target 305 within said volume. Receiver 320 comprises a plurality of Lenses 405, for example lenses 2,1, 2,2 . . . 2,K as described above. Thick lines indicate optical connections, while thin lines indicate electrical connections. The Plurality of Lenses 405 are coupled to a rigid frame. The optical field of view of said Plurality of Lenses 405 combines to form an optical far field. Calibration Reflector 307 is in the far field of Plurality of Lenses 405 and during the calibration of the receiver reflects a uniform calibration reflection (specular) into Plurality of Lenses 405. The laser calibration reflection from Calibrating Reflector. 307 is uniform. That is, the laser energy phase front of the calibration reflection departing from reflector 307 is assumed a constant point source.

A Plurality of Detectors 407, for example D2,1, D2,2, . . . D2,K, are part of Receiver 320. Each Detector of said Plurality of Detectors 407 is optically coupled to each lens of said Plurality of Lenses 407. Each Detector of said Plurality of Detectors 407 responds to the uniform phase front (optical energy) from Calibration Reflector 307 arriving at its corresponding lens as well as that supplied from Local Oscillator 401 using Paths 409. There is one optical path from plurality of Paths 409 from local oscillator 401 to each of said plurality of Detectors 407. Paths 409 retard the output of Local Oscillator 401 proportionally to the physical lengths of Paths 409 from Local Oscillator 401 to each of Detectors 407. Each Detector of said Plurality of Detectors 407 has an output voltage after a delay in response to the combination of the arriving calibration reflection from Calibrating Reflector 307.The Local Oscillator 401 is tuned to said frequency (the modulating frequency).

Paths 409 and said delay induce a relative phase shift in each output of detectors 407 with respect to the incoming optical wavefront and Local Oscillator 401. This relative phase shift is measured and recorded within computer 403 for each detector of said plurality of detectors during a calibration step.

Each of a plurality of Analog to Digital (A/D) Converters 411, for example ADC 2,1, ADC 2,2 . . . ADC 2,K are connected to Each Detector of said Plurality of Detectors 407 for converting the output voltage from Each Detector of said Plurality of Detectors 407 into a corresponding plurality of digital detector voltages. Digital detector voltages are placed on wide Digital Bus 413 for reception by Computer 403. Digital detector voltages are complex quantities of the form I+jQ preserving phase information from said Detectors 407. Each digital detector voltage of said plurality of digital detector voltages has one of said time stamps, or similar means, to identify a time of conversion of said output voltage from each Detector of said Plurality of Detectors 407 into a corresponding plurality of digital detector voltages to obtain timed voltages.

In this disclosure, the term "time stamped" is a general term denoting some form of time marking of the quantity in question. Time marking can be done many ways, for example by performing A/D conversions in sequence at a certain rate starting at a certain time, as for example, the zero crossing of one of the (modulation) frequencies. It is important in this disclosure to ascertain the time a measurement performed so as to compare and correlate measured quantities obtained at the same time with respect to each other and a time reference point.

Each of the timed voltages are stored in Computer 403 using Digital Bus 413 during a calibration step. Clock 415 is used to time stamp the outputs of A/D converters 411 for time identification and time synchronization, facilitating subsequent correlation with temperature and acceleration readings. Detailed below, within Computer 403, each of the timed voltages transmitted via Bus 413 will be used to compute said delay and said path during a calibration step. Subsequently, after completion of the calibration step, while imaging Target 305, each of said timed voltages will be individually phase shifted to correct for said delay and said path, from data collected during the calibration step.

Taking FIG. 3 and FIG. 4 together, during the calibration step, Transmitter 300 illuminates a Calibration Reflector 307 having known reflecting parameters. That is, Calibration Reflector 307 will uniformly reflect its laser illumination (coherent optical energy) to Receiver 320, illuminating all lenses in Receiver Lenslet Array 303 with a uniform wavefront.

Calibration Reflector 307 is located within the volume illuminated by Transmitter 300 at a known position with respect to Receiver 320 in the far field. Calibration Reflector 307 is used to generate a reflection of laser energy from transmitter 300 to be received by the plurality of lenses 2,1, 2,2 . . . M,K within said Receiver 320 during the calibration step. The reflection from Calibration Reflector 307 is used to measure a relative phase shift for each detector of said plurality of Detectors 407. The relative phase shift induced by Paths 409 to Local Oscillator 401 from each Detector of said Plurality of Detectors 407 and delay for each Detector of said Plurality of Detectors 407 is measured with respect to a reference detector output voltage. That is, the measurement of phase shift within computer 403 is not absolute, but rather relative to one of the detectors.

Where the modulating frequency is, for example, sinusoidal, each detector output voltage $VOUT_i$ will have a component of the form $$VOUT_i = \cos(2\pi f_i) + \phi_i$$

for each frequency $f_i$, where i identifies the $i^{th}$ sinusoidal frequency calibration is conducted for.

Figure 5:
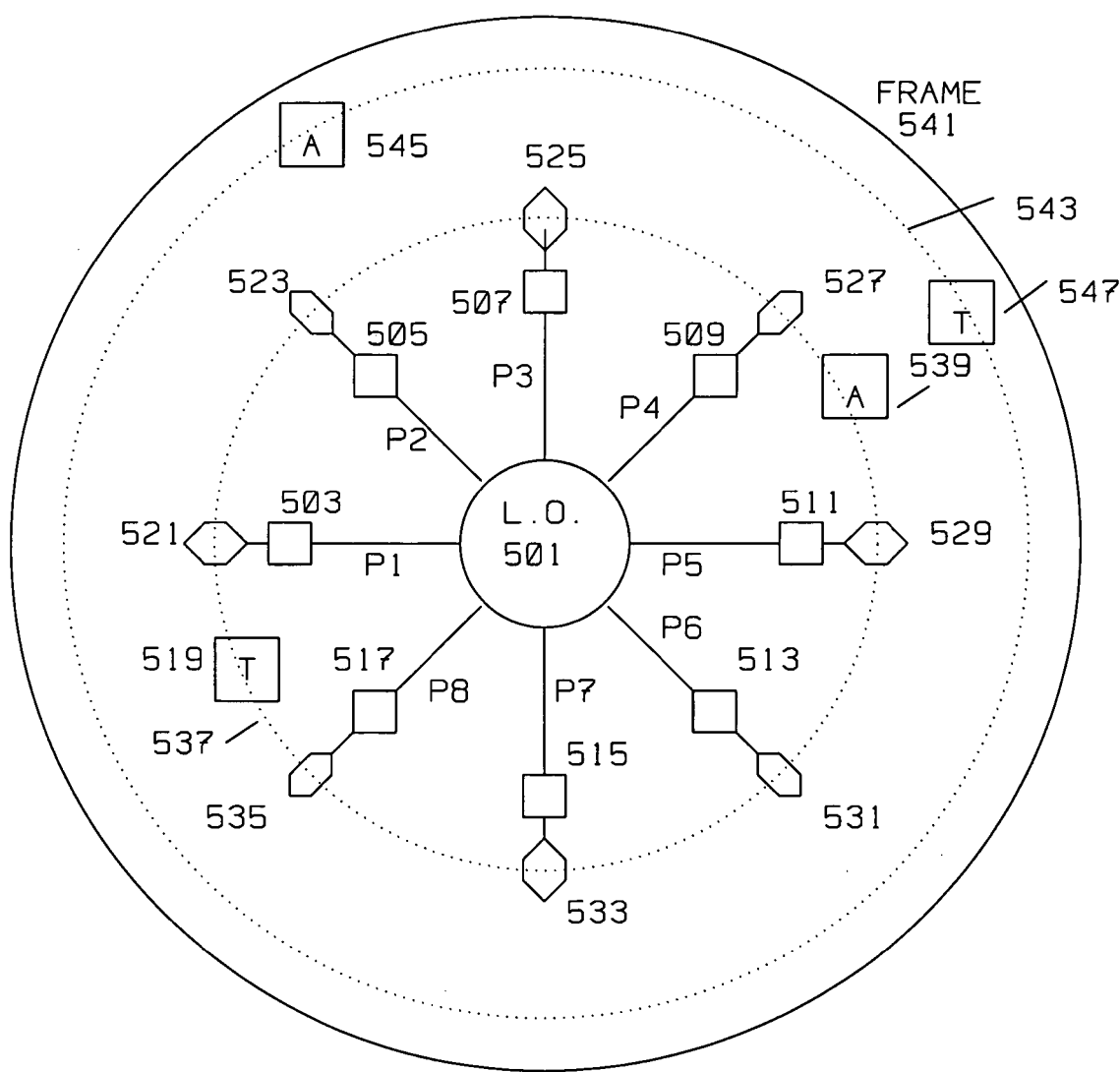
FIG. 5 shows an exemplary receiver having symmetrical arrangement of lenses and detectors distributed around a local oscillator along isothermal contours.

$f_i$ are the modulation frequencies arriving from transmitter 300 and generated by Local Oscillator 401 in FIG. 4 or Local Oscillator 501 in FIG. 5. Typically, output of Local Oscillator 501 is used by both, typically co-located Transmitter 300 and Receiver 320 as the same modulation frequency. The integral number of cycles $\cos(2\pi f_i)$ do not impact subsequent phase related coherent processing for target 305. It is $\phi_i$, the relative phase shift, that is quantified during the calibration step of this disclosure for each detector to perform subsequent coherent target 305 imaging. Thus, a reference detector output voltage is chosen from the plurality of detector output voltages as a reference, and measurements of $\phi_i$ are made with respect to this reference detector for every frequency $f_i$.

A sinusoidal waveform is detailed herein as the frequency used for modulation, however, it is understood that any modulation, such as a chirp, or other waveform can be used for this purpose. Typically, all transmitted modulations will produce the same peak signal to noise ratio at the output of a matched filter, while the time-structure of the waveform influences the range and velocity resolution of the system. Here, the emphasis is on detecting relative phase variations among the combination of lenses and detectors shown in FIG. 4. Thus, sinusoidal modulation is an illustrative example of the principles contained herein.

LADAR laser carrier wavelength, modulated by said frequency, for this disclosure, is in the range of 0.2 to 100 microns. Typical frequency used for modulation is from 5 Mhz to 500 Mhz. A/D conversion rates are in the order of 1 Mhz to 50 Mhz, 8 to 16 bits accuracy.

Calibration Reflector 307 is preferably located in the far field. The option of locating Calibration Reflector 307 in the near field exists, however will require additional phase corrections.

FIG. 5 further details Receiver 320. One or more temperature probes, such as Temperature Probe 519 and 547, are attached to Frame 541 to report time stamped temperatures at a temperature time within the rigid structure of Frame 541 and attached lenses and detectors to, for example, Computer 403. Temperature time for time stamping temperature readings from probes 519 and 547 is read from clock 415. Temperature probes 519 and 547 are positioned along one or more isothermal contours 537 and 543 respectively. Lenses 521, 523, 525, 527, 529, 531 and 533, are positioned along Isothermal Contour 537. Respectively associated with the lenses are Detectors 503, 505, 507, 509, 511, 513, 515 and 517, also preferably located on an isothermal contour, such as Isothermal Contour 537. Lenses and detectors are on the same isothermal contour thereby assuring a uniform operating temperature for all lenses and detectors, as well as similar rates of temperature variation. While only a two dimensional diagram of frame 541 is shown, it is understood that frame 541 is three dimensional, and isothermal contours extend in the height of frame 541. Stacking Lenses 521, 523, 525, 527, 529, 531 and 533, on their respective Detectors 503, 505, 507, 509, 511, 513, 515 and 517, allows positioning of lenses and detectors on the same isothermal contour, such as Isothermal Contour 537.

Isothermal contours are identified during the manufacture of receiver 320 by measuring the location of a contour within frame 541 where temperatures are equal during normal, full power operation of receiver 320. Temperature gradients across all of frame 541 are computed from temperature readings of temperature probes 519 and 547.

Temperature gradients, time stamped temperature and temperature time are used to identify temperature of said frame during the calibration step as well as during computations for coherent imaging of target 305.

Within Receiver 320, as shown in FIG. 5, one or more accelerometers, such as Accelerometer 545 and 539, are attached to Frame 541. Accelerometers 545 and 539 report time stamped acceleration at an acceleration time at a position within Frame 541 at time intervals. Time stamped acceleration at an acceleration time are stored within Computer 403, where the time stamp identifies the exact time of the reported acceleration. The accelerometers are positioned along isothermal contours 537 and 543. Time stamped acceleration is used to identify the position in space of Lenses 521, 523, 525, 527, 529, 531 and 533, during the calibration step as well as during computations for coherent imaging of Target 305. Time Stamped Acceleration readings are made every 1 to 50 milliseconds.

During the calibration step, a time stamped list is recorded within Computer 403 of the relative phase shift for each detector of said plurality of detectors for each of said plurality of frequencies, at one or more temperatures along with said acceleration at time intervals compatible with the time constants involved. Typical time intervals for temperature are derived from time constants computed from heat capacity of and the mass of the lenses/detector combination along with the rigid frame they are mechanically mounted on, typically 0.1 second. An examination of the relationship of isothermal contours and their relative proximity and symmetry with respect to the Local Oscillator 501 further identify the rate of temperature reporting.

Acceleration readings time intervals are determined by how rigid exemplary Frame 541 is when subjected to mechanical loads in the environment of the platform carrying it. From the plurality of accelerometer readings, flexing and related deformation of frame 541 can be computed, thus arriving at displacement of lenses Lenses 521, 523, 525, 527, 529, 531 and 533 with respect to each other for a particular value of timed stamped acceleration at a particular acceleration time.

In a preferred embodiment, as shown in FIG. 5, the plurality of lenses in receiver 320 form a lenslet array. The optical Paths P1, P2, P3, P4, P5, P6, P7 and P8 from Local Oscillator 501 to respective Detectors 503, 505, 507, 509, 511, 513, 515 and 517, are of equal length, traversing an equal number isothermal contours within frame 541. While only 8 lenses and detectors are shown, it is understood that the geometry applies to any number of lenses and detectors positioned equidistantly and symmetrically with respect to a centrally located Local Oscillator 501.

The arrangement of elements in FIG. 5 is symmetrical about the center and Local Oscillator 501. The plurality of lenses and plurality of detectors are positioned within said frame equidistantly and symmetrically from Local Oscillator 501.

The calibration step is conducted at a plurality of frequencies, $f_1, f_2 \ldots f_n$ from, for example, Local Oscillator 401. A chirp, covering frequencies $f_1$ to $f_n$ is also envisioned.

During the calibration step, the observed relative phase shift will be due to two causes:

a) variation in paths 409 from Local Oscillator 401 to detectors 407 and b) delays of arrival of calibration reflection from reflector 307 to detectors 407.

Delays are assumed constant for each of said plurality of frequencies, while variation in paths will be related to Local Oscillator 401 frequency. Each frequency of a plurality of frequencies will generate phase shifts at each detector. For each frequency, an equation can be set up within computer 403 in the form:

Phase shift=path+delay

Multiple frequencies will generate multiple data pairs to solve above equation for the variables path and delay. Thus computed, and time stamped, computer 403 will store a calibrated path, the path variable, and a timed calibrated delay the delay variable, for each Detector of said Plurality of Detectors 407.

Figure 6:
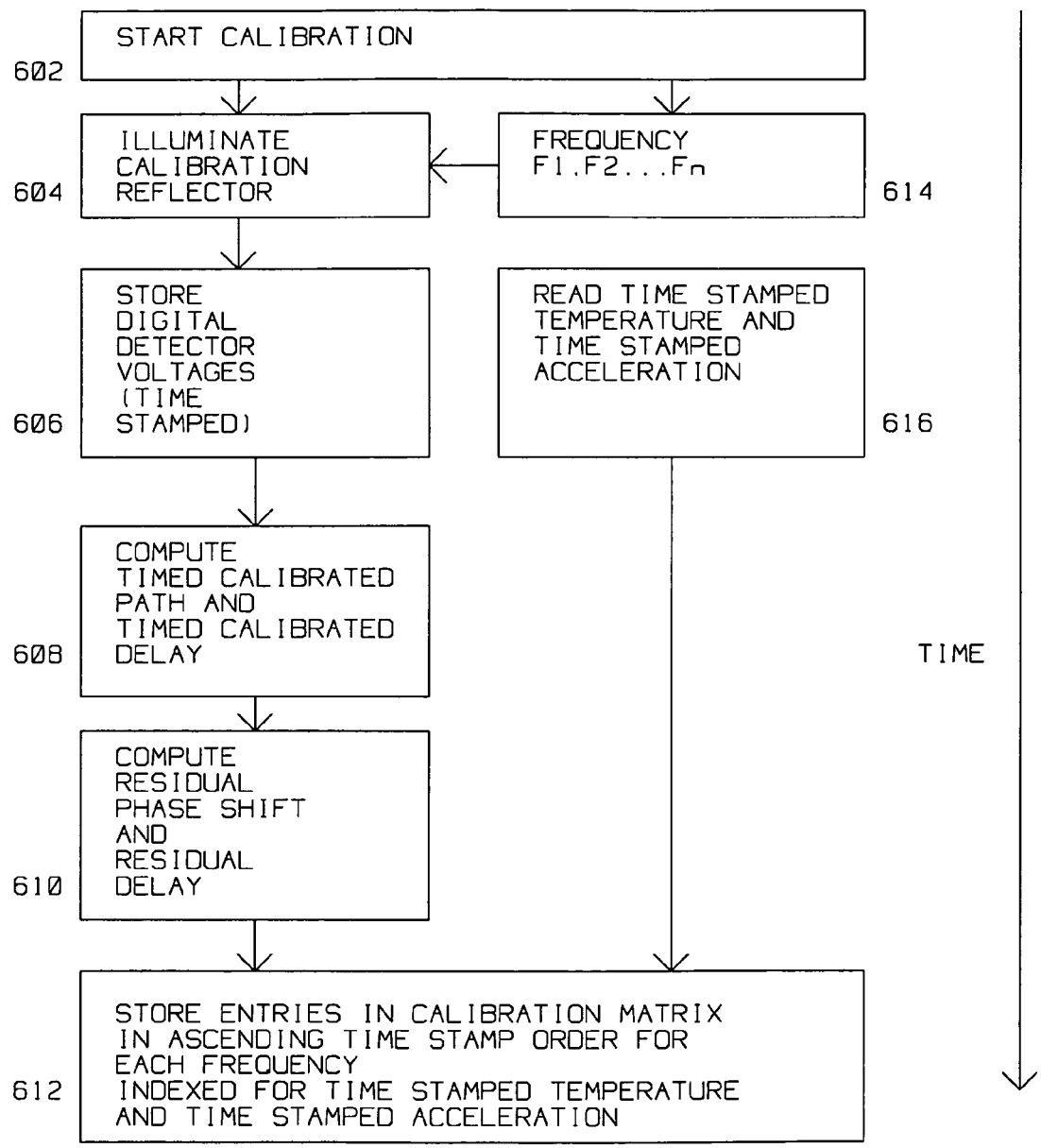
FIG. 6 shows the calibration flow diagram to arrive at a calibration matrix of the present disclosure.

A phase adjustment step is conducted after said calibration step. As shown in FIG. 6, Start Calibration 602 initiates Illuminate Calibration Reflector 604 using a laser beam modulated by one of a plurality of Frequency $F_1, F_2 \ldots F_n$ 614. The timed digital detector voltage obtained by the arrival of the reflection from Reflector 307 are stored in Store Digital Detector Voltages (Time Stamped) 606 in Computer 403. Computer 403 computes time calibrated path and timed calibrated delay in Compute Time Calibrated Path and Timed Calibrated Delay 608. Phase adjustment is computed in Compute Residual Phase Shift and Residual Delay 610. Concurrent with the A/D conversion into digital detector voltages, Read Times Stamped Temperature and Time Stamped Acceleration 616 is performed. All A/D conversions as well as Time Stamped Temperature and Time Stamped Acceleration are read simultaneously and stored in computer 403. Digital bus 413 is wide enough to allow such parallel data flow.

The phase adjustment is performed while receiving a reflection from Calibration Reflector 307. Computer 403 phase corrects the reflection from Calibration Reflector 307 in accordance with computed calibrated path and time calibrated delay and time for each Detector of said Plurality of Detectors 407 computed during the calibration step.

Ideally, after the calibration step, the phase shift is zero for each Detector of said Plurality of Detectors 407 after compensating for the timed calibrated path and the timed calibrated delay of the image of Calibration Reflector 307 at one or more frequencies. For non-ideal circumstances, where the resulting phase shift for plurality of detectors 407 is not zero, a residual phase shift is computed for each Detector of said Plurality of Detectors 407 by comparing said timed calibrated path for each Detector of said Plurality of Detectors 407 with a stored phase profile to obtain a phase correction for each detector of said Plurality of Detectors 407.

Similarly, a residual delay is computed for each Detector of said Plurality of Detectors 407 by comparing said timed calibrated delay for each Detector of said Plurality of Detectors 407 with a stored delay profile for each Detector of said Plurality of Detectors 407 to obtain a delay correction for each Detector of said Plurality of Detectors 407.

The stored phase profile and stored delay profile are previously stored in Computer 403 having been derived from historical phase data of a particular Receiver 320. Where no historical phase data is available, the stored phase profile and stored delay profile equal the opposite of the deviation from the ideal, thus bringing the relative phase shift for each detector of said plurality of detectors 407 to zero.

The goal is to phase correct returns from target 305 for coherent imaging and tracking using calibration data obtained during the calibration step. To achieve this goal, said calibrated path, said residual phase shift, said calibrated delay and said residual delay are stored as entries in a calibration matrix by Computer 403 for each of said frequencies $f_1 \ldots f_n$. The entries are indexed for the time stamped temperature, the temperature time, the time stamped acceleration, and the acceleration time. That is, the calibration matrix in filled in Store Entries in Calibration Matrix in Ascending Time Stamp Order For Each Frequency Indexed for Time Stamped Temperature and time Stamped Acceleration 612 to store phase correction information gathered during the calibration step and phase adjustment, for example indexed by temperature and acceleration, in order of ascending time stamps.

The entries in the Calibration Matrix are used during target 305 identification and/or tracking. Upon arrival of a target reflection, a time stamped temperature is read from temperature sensors 519, 547, an time stamped acceleration is read from acceleration sensors 539, 545. Accessing the Calibration Matrix, corresponding calibrated path, residual phase shift, calibrated delay and residual delay are retrieved from the calibration matrix for the temperature and acceleration reading at the time of target reflection arrival. The retrieved phase correction data, calibrated path, residual phase shift, calibrated delay and residual delay are applied to the digital detector voltages from each detector of said plurality of detectors 407 returned from target 305 to phase shift data from reflection of target 305. Thus, compensated for phase shifts as a function of temperature and acceleration, the data from reflection of target 305 is used for coherent processing.

The transmitter 300 laser beam is formed from a plurality of LASER transmitters, each of said LASER transmitters modulated by said frequency, said frequency phase delayed at each of said LASER transmitters with respect to a reference. Grisms are used on each transmitter lens of Receiver Lenslet Array 303 to further widen the coverage of each transmitter beam.

It should be noted that the the optical field of view of each leans of said plurality of lenses 405 do not overlap in certain cases. For a wider field of view, a grism (a grating and prism combination) is optically connected to each lens of said plurality of lenses 405.

All references cited in this document are incorporated herein in their entirety.

Although presented in exemplary fashion employing specific embodiments, the disclosed structures are not intended to be so limited. For example, although a calibration matrix is disclosed organized on time sequence based on time stamps, it is envisioned that other ways of organizing the data related to temperature, acceleration time calibrated path and time calibrated delay may be applied.

Those skilled in the art will also appreciate that numerous changes and modifications could be made to the embodiment described herein without departing in any way from the invention. These changes and modifications and all obvious variations of the disclosed embodiment are intended to be embraced by the claims to the limits set by law.

The invention claimed is:

1. A LADAR system for coherently imaging a target within a volume, comprising:

a laser transmitter, said transmitter illuminating said volume with a laser beam modulated with a frequency;

a computer;
a receiver having isothermal contours, said receiver receiving calibration reflections of said laser beam from a calibration reflector within said volume at a known location, said receiver further comprising:
a clock for distributing time stamps within said receiver, said time stamps referencing a time interval to a time reference;
a plurality of lenses mechanically coupled to a frame, each lens of said plurality of lenses having an optical field of view, said plurality of lenses combining to form an optical far field, said far field oriented to cover said volume;
a plurality of detectors, one detector of said plurality of detectors coupled to each lens of said plurality of lenses, each detector of said plurality of detectors having an output voltage after a delay, said delay measured from an arrival time said calibration reflection impinges upon each lens of said plurality of lenses, each detector of said plurality of detectors coupled to a local oscillator by a path, said local oscillator tuned to said frequency, said path and said delay inducing a relative phase shift in said output voltage with respect to said arrival time of said calibration reflection;
a plurality of analog to digital converters for converting said output voltage from each detector of said plurality of detectors into a corresponding plurality of digital detector voltages, said digital detector voltages stored in said computer to compute said relative phase shift for each digital detector voltage of said plurality of digital detector voltages with respect to one of said digital detector voltages during a calibration step.

2. A LADAR system as described in claim 1 wherein each digital detector voltage of said plurality of digital detector voltages has one of said time stamps to identify a time of conversion of said output voltage from each detector of said plurality of detectors into a corresponding plurality of digital detector voltages to obtain timed voltages, each of said timed voltages stored in said computer.

3. A LADAR system as described in claim 2 wherein said calibration reflector is located in said far field.

4. A LADAR system as described in claim 3 wherein said calibration step is conducted at a plurality of frequencies.

5. A LADAR system as described in claim 4 wherein one or more temperature probes are attached to said frame, each of said temperature probes reporting a time stamped temperature at a temperature time, said temperature time identified by said time stamp from said clock, said time stamped temperature stored within said computer.

6. A LADAR system as described in claim 5 wherein said one or more temperature probes are positioned along one or more of said isothermal contours.

7. A LADAR system as described in claim 4 wherein one or more accelerometers are attached to said frame, each of said accelerometers reporting a time stamped acceleration at a position within said frame at an acceleration time, said acceleration time identified by said time stamp from said clock, said time stamped acceleration stored within said computer.

8. A LADAR system as described in claim 7 wherein said one or more accelerometers are attached to said frame along one or more of said isothermal contours.

9. A LADAR system as described in claim 4 wherein said computer computes said delay and said path from said timed voltages generated after performing said calibration step using said plurality of frequencies to obtain a timed calibrated path and a timed calibrated delay for each detector of said plurality of detectors.

10. A LADAR system as described in claim 9 wherein a phase adjustment step is conducted after said calibration step, said phase adjustment step conducted at one or more of said frequency, said phase adjustment step comprising the steps of:
computing a residual phase shift for each detector of said plurality of detectors by comparing said timed calibrated path for each detector of said plurality of detectors with a stored phase profile to obtain a phase correction for each detector of said plurality of detectors;
computing a residual delay for each detector of said plurality of detectors by comparing said timed calibrated delay for each detector of said plurality of detectors with a stored delay profile for each detector of said plurality of detectors to obtain a delay correction for each detector of said plurality of detectors.
storing within said computer said residual phase shift for each of said detector of said plurality of detectors and said residual delay for each of said detector of said plurality of detectors.

11. A LADAR system as described in claim 10 wherein said calibrated path, said residual phase shift, said calibrated delay and said residual delay are stored as entries in a calibration matrix by said computer for each of said frequencies, said entries in ascending time stamp order, said entries indexed for said time stamped temperature, and said time stamped acceleration.

12. A LADAR system as described in claim 11 wherein entries in said calibration matrix for said calibrated path and calibrated delay are read during imaging of said target for phase compensation of said target reflections by selecting said entries within said calibration matrix matching said time stamped temperature to time stamped temperature reported by said temperature probes during said imaging of said target.

13. A LADAR system as described in claim 11 wherein entries in said calibration matrix for said calibrated path and calibrated delay are read during imaging of said target for phase compensation of target reflections from said target by selecting said entries within said calibration matrix matching said time stamped acceleration to time stamped acceleration reported by said accelerometers during said imaging of said target.

14. A LADAR system as described in claim 4 wherein said plurality of lenses form a lenslet array.

15. A LADAR system as described in claim 4 wherein said plurality of lenses and said plurality of detectors are positioned within said frame to make each of said path from each of said detectors to said local oscillator equal.

16. A LADAR system as described in claim 4 wherein said plurality of lenses and said plurality of detectors are positioned within said frame along said isothermal contours.

17. A LADAR system as described in claim 4 wherein said plurality of lenses and said plurality of detectors are positioned within said frame equidistantly and symmetrically from said local oscillator.

18. A LADAR system as described in claim 4 wherein said laser beam is formed from a plurality of LASER transmitters, each of said LASER transmitters modulated by said frequency, said frequency phase delayed at each of said LASER transmitters with respect to a reference.

19. A LADAR system as described in claim 4 wherein said optical field of view of said lenses of said plurality of lenses do not overlap.

20. A LADAR system as described in claim 4 wherein a grism is optically connected to each lens of said plurality of lenses.

21. A method for coherently imaging a target within a volume using a LADAR, said method comprising the steps of:
   illuminating said volume with a laser beam modulated with a frequency from a transmitter;
   receiving calibration reflection of said laser beam from a calibration reflector within said volume at a known location using a receiver having isothermal contours, said receiver further comprising:
   a clock for distributing time stamps within said receiver, said time stamps referencing a time interval to a time reference;
   a plurality of lenses mechanically coupled to a frame, each lens of said plurality of lenses having an optical field of view, said plurality of lenses combining to form an optical far field, said far field oriented to cover said volume;
   a plurality of detectors, one detector of said plurality of detectors coupled to each lens of said plurality of lenses, each detector of said plurality of detectors having an output voltage after a delay, said delay measured from an arrival time said calibration reflection impinges upon each lens of said plurality of lenses, each detector of said plurality of detectors coupled to a local oscillator by a path, said local oscillator tuned to said frequency, said path and said delay inducing a relative phase shift in said output voltage with respect to said arrival time of said calibration reflection;
   a plurality of analog to digital converters for converting said output voltage from each detector of said plurality of detectors into a corresponding plurality of digital detector voltages, said digital detector voltages stored in a computer to compute said relative phase shift for each digital detector voltage of said plurality of digital detector voltages with respect to one of said digital detector voltages during a calibration step.

22. A method as described in claim 21 wherein each digital detector voltage of said plurality of digital detector voltages has one of said time stamps to identify a time of conversion of said output voltage from each detector of said plurality of detectors into a corresponding plurality of digital detector voltages to obtain timed voltages, each of said timed voltages stored in said computer.

23. A method as described in claim 22 wherein said calibration reflector is located in said far field.

24. A method as described in claim 23 wherein said calibration step is conducted at a plurality of frequencies.

25. A method as described in claim 21 wherein one or more temperature probes are attached to said frame, each of said temperature probes reporting a time stamped temperature at a temperature time, said temperature time identified by said time stamp from said clock, said time stamped temperature stored within said computer.

26. A method as described in claim 25 wherein said one or more temperature probes are positioned along one or more of said isothermal contours.

27. A method as described in claim 24 wherein one or more accelerometers are attached to said frame, each of said accelerometers reporting a time stamped acceleration at a position within said frame at an acceleration time, said acceleration time identified by said time stamp from said clock, said time stamped acceleration stored within said computer.

28. A method as described in claim 27 wherein said one or more accelerometers are attached to said frame along one or more of said isothermal contours.

29. A method as described in claim 24 wherein said computer computes said delay and said path from said timed voltages generated after performing said calibration step using said plurality of frequencies to obtain a timed calibrated path and a timed calibrated delay for each detector of said plurality of detectors.

30. A method as described in claim 29 wherein a phase adjustment step is conducted after said calibration step, said phase adjustment step conducted at one or more of said frequency, said phase adjustment step comprising the steps of:
   computing a residual phase shift for each detector of said plurality of detectors by comparing said timed calibrated path for each detector of said plurality of detectors with a stored phase profile to obtain a phase correction for each detector of said plurality of detectors;
   computing a residual delay for each detector of said plurality of detectors by comparing said timed calibrated delay for each detector of said plurality of detectors with a stored delay profile for each detector of said plurality of detectors to obtain a delay correction for each detector of said plurality of detectors.
   storing within said computer said residual phase shift for each of said detector of said plurality of detectors and said residual delay for each of said detector of said plurality of detectors.

31. A method as described in claim 30 wherein said calibrated path, said residual phase shift, said calibrated delay and said residual delay are stored as entries in a calibration matrix by said computer for each of said frequencies, said entries in ascending time stamp order, said entries indexed for said time stamped temperature, and said time stamped acceleration.

32. A method as described in claim 31 wherein entries in said calibration matrix for said calibrated path and calibrated delay are read during imaging of said target for phase compensation of said target reflections by selecting said entries within said calibration matrix matching said time stamped temperature to time stamped temperature reported by said temperature probes during said imaging of said target.

33. A method as described in claim 31 wherein entries in said calibration matrix for said calibrated path and calibrated delay are read during imaging of said target for phase compensation of target reflections from said target by selecting said entries within said calibration matrix matching said time stamped acceleration to time stamped acceleration reported by said accelerometers during said imaging of said target.

34. A method as described in claim 24 wherein said plurality of lenses form a lenslet array.

35. A method as described in claim 24 wherein said plurality of lenses and said plurality of detectors are positioned within said frame to make each of said path from each of said detectors to said local oscillator equal.

36. A method as described in claim 24 wherein said plurality of lenses and said plurality of detectors are positioned within said frame along said isothermal contours.

37. A method as described in claim 24 wherein said plurality of lenses and said plurality of detectors are positioned within said frame equidistantly and symmetrically from said local oscillator.

38. A method as described in claim 24 wherein said laser beam is formed from a plurality of LASER transmitters, each of said LASER transmitters modulated by said frequency, said frequency phase delayed at each of said LASER transmitters with respect to a reference.

39. A method as described in claim 24 wherein said optical field of view of each of said lenses of said plurality of lenses do not overlap.

40. A method as described in claim 24 wherein a grism is optically connected to each lens of said plurality of lenses.

* * * * *